(12) United States Patent
Sugumar et al.

(10) Patent No.: US 9,552,308 B2
(45) Date of Patent: Jan. 24, 2017

(54) EARLY WAKE-WARN FOR CLOCK GATING CONTROL

(71) Applicant: Intel Corporation, Santa Clara, CA (US)

(72) Inventors: Suresh Sugumar, Bangalore (IN); Mahesh K. Kumashikar, Bangalore (IN); Rahul Pal, Bangalore (IN); Sridhar Muthrasanallur, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,919

(22) PCT Filed: Sep. 30, 2013

(86) PCT No.: PCT/US2013/062751
§ 371 (c)(1),
(2) Date: Dec. 17, 2013

(87) PCT Pub. No.: WO2015/047422
PCT Pub. Date: Apr. 2, 2015

(65) Prior Publication Data
US 2015/0095688 A1    Apr. 2, 2015

(51) Int. Cl.
*G06F 13/00* (2006.01)
*G06F 13/42* (2006.01)
*G06F 9/46* (2006.01)

(52) U.S. Cl.
CPC ............... *G06F 13/00* (2013.01); *G06F 9/46* (2013.01); *G06F 13/4273* (2013.01)

(58) Field of Classification Search
CPC ............ G06F 1/3202; G06F 1/04; G06F 1/10; G06F 1/08; G06F 9/3869
See application file for complete search history.

(56) References Cited

U.S. PATENT DOCUMENTS

| 6,748,546 | B1 * | 6/2004 | Mirov | G06F 1/08 713/300 |
| 6,836,824 | B1 * | 12/2004 | Mirov | G06F 1/08 365/226 |
| 2010/0235672 | A1 | 9/2010 | Zhang et al. | |
| 2011/0072180 | A1 | 3/2011 | Lee | |

(Continued)

FOREIGN PATENT DOCUMENTS

WO    WO 2013/027951    2/2013

OTHER PUBLICATIONS

PCT International Search Report and Written Opinion in PCT International Application Serial No. PCT/US2013/062751 mailed on Jun. 30, 2014.

(Continued)

*Primary Examiner* — Zahid Choudhury
(74) *Attorney, Agent, or Firm* — Patent Capital Group

(57) ABSTRACT

A request associated with a particular cache record is generated to be sent to a system component associated with a cache bank over an interconnect. A wake-warn signal is sent over a dedicated wake-warn channel to indicate to the system component that the request is to arrive. Wake-warn signals cause a disabled clock to be ungated to an enabled state. The request is then sent to the system component.

26 Claims, 9 Drawing Sheets

(56) References Cited

U.S. PATENT DOCUMENTS

| | | | |
|---|---|---|---|
| 2011/0296214 A1* | 12/2011 | Arntzen | G06F 1/3203 |
| | | | 713/320 |
| 2012/0011383 A1 | 1/2012 | Bhoj | |
| 2013/0083611 A1* | 4/2013 | Ware | G11C 11/4072 |
| | | | 365/191 |
| 2013/0147526 A1 | 6/2013 | Kim et al. | |
| 2014/0177604 A1* | 6/2014 | Lee | H04W 52/02 |
| | | | 370/336 |
| 2014/0351618 A1* | 11/2014 | Connell | G06F 1/3265 |
| | | | 713/323 |

OTHER PUBLICATIONS

International Search Report on Patentability and Written Opinion in PCT International Application Serial No. PCT/US2013/062751 dated Apr. 5, 2016.

\* cited by examiner

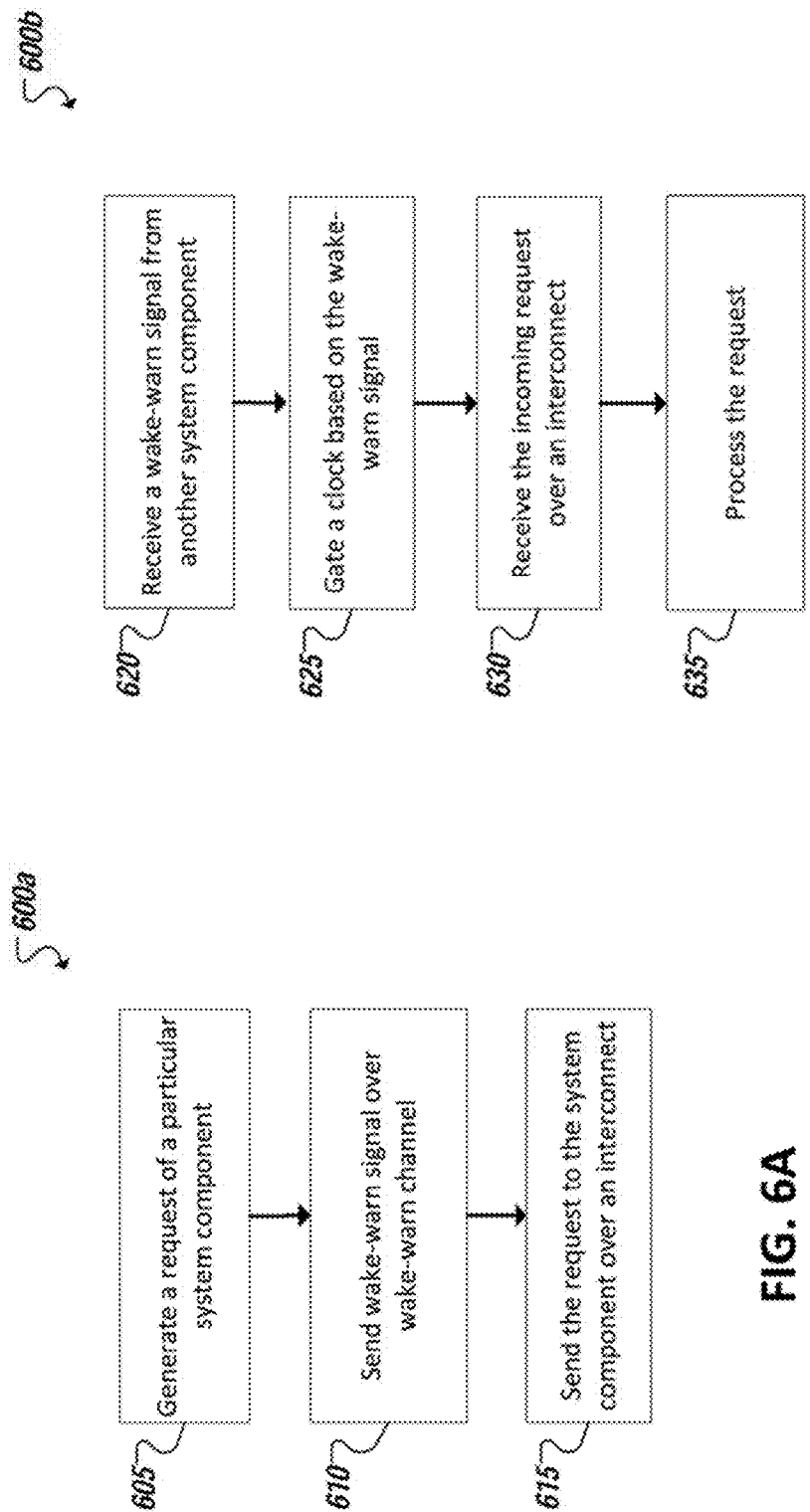

EARLY WAKE-WARN FOR CLOCK GATING CONTROL

FIELD

This disclosure pertains to computing systems, and in particular (but not exclusively) clock gating in computing systems.

BACKGROUND

Processor chips have evolved significantly in recent decades. The advent of multi-core chips has enabled parallel computing and other functionality within computing devices including personal computers and servers. Processors were originally developed with only one core. Each core can be an independent central processing unit (CPU) capable of reading executing program instructions. Dual-, quad-, and even hexa-core processors have been developed for personal computing devices, while high performance server chips have been developed with upwards of ten, twenty, and more cores. Cores can be interconnected along with other on-chip components utilizing an on-chip interconnect of wire conductors or other transmission media. Scaling the number of cores on a chip can challenge chip designers seeking to facilitate high-speed interconnection of the cores. A variety of interconnect architectures have been developed including ring bus interconnect architectures, among other examples.

Clock designs for high-speed computing systems continue to advance. Modern clock have be realized with speed exceeding 8 GHz. Integrated circuits (ICs) can use a clock signal in order to synchronize different components of the circuit or chip. More complex systems including multiple components can utilize multiple synchronized clock signals to drive and synchronize the components' interactions. A clock signal might also be gated/ungated, by selectively disabling and/or enabling the clock signal for a certain part of a circuit. Clock gating can be used, for instance, to save power by effectively shutting down portions of a digital circuit driven by the clocks when the corresponding components are not in use.

BRIEF DESCRIPTION OF THE DRAWINGS

FIGS. 6A-6B illustrate flowcharts showing example techniques of a system supporting early wake-warn functionality.

Like reference numbers and designations in the various drawings indicate like elements.

DETAILED DESCRIPTION

Figure 1:
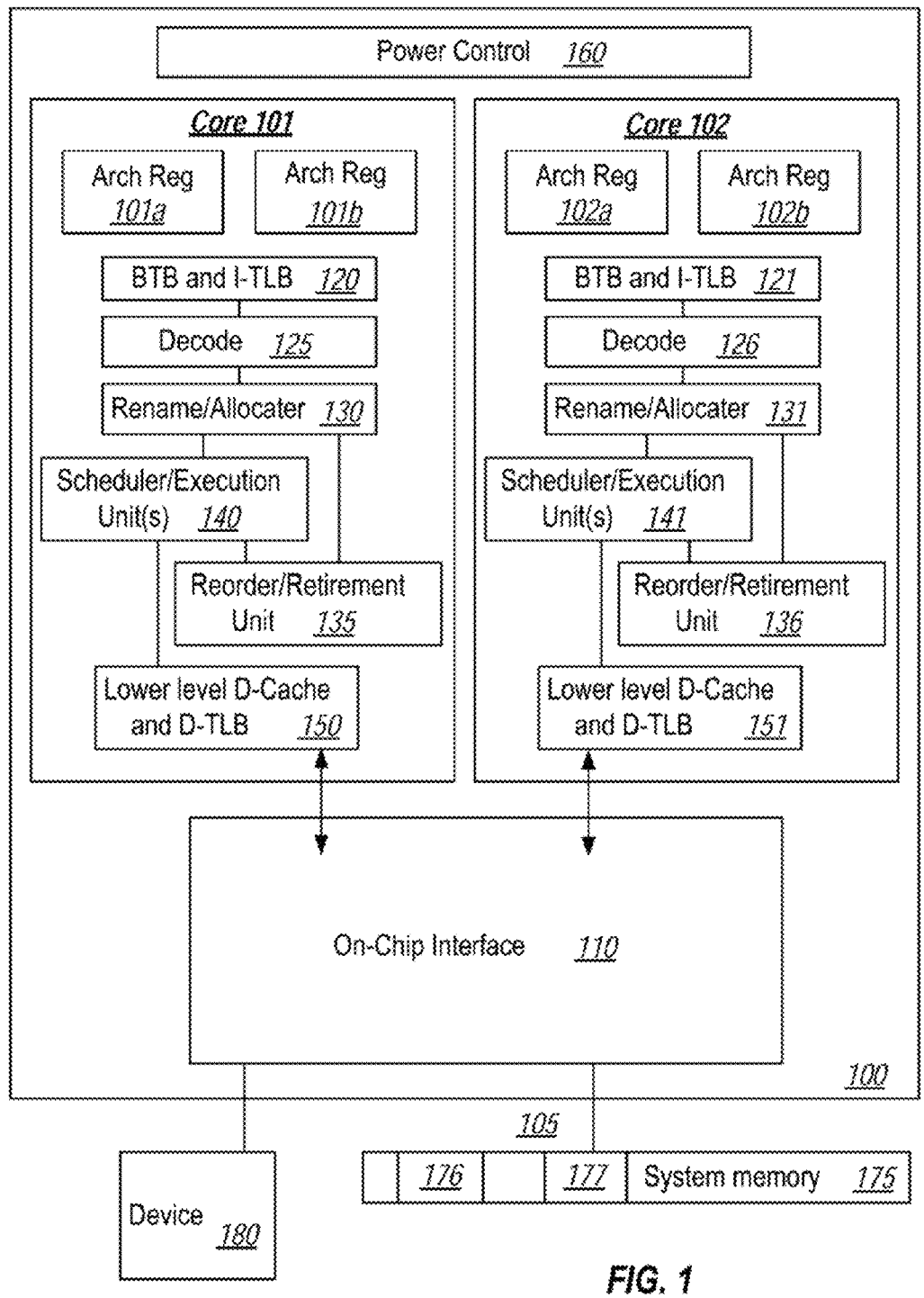
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. In order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 can be considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In cores 101, 102, other smaller resources, such as instruction pointers and renaming logic in allocator and renamer block 130, 131 may also be replicated for threads 101a and 101b and 102a and 102, respectively. Some resources, such as re-order buffers in reorder/retirement unit 135, 136, ILTB 120, 121, load/store buffers, and queues may be shared through partitioning. Other resources, such as general purpose internal registers, page-table base register(s), low-level data-cache and data-TLB 150, 151 execution unit(s) 140, 141 and portions of out-of-order unit are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Example interconnect fabrics and protocols can include such examples a Peripheral Component Interconnect (PCI) Express (PCIe) architecture, Intel QuickPath Interconnect (QPI) architecture, Mobile Industry Processor Interface (MIPI), among others. A range of supported processors may be reached through use of multiple domains or other interconnects between node controllers.

An interconnect fabric architecture can include a definition of a layered protocol architecture. In one embodiment, protocol layers (coherent, non-coherent, and optionally other memory based protocols), a routing layer, a link layer, and a physical layer can be provided. Furthermore, the interconnect can include enhancements related to power managers, design for test and debug (DFT), fault handling, registers, security, etc.

The physical layer of an interconnect fabric, in one embodiment, can be responsible for the fast transfer of information on the physical medium (electrical or optical etc.). The physical link is point to point between two Link layer entities. The Link layer can abstract the Physical layer from the upper layers and provide the capability to reliably transfer data (as well as requests) and manage flow control between two directly connected entities. It also is responsible for virtualizing the physical channel into multiple virtual channels and message classes. The Protocol layer can rely on the Link layer to map protocol messages into the appropriate message classes and virtual channels before handing them to the Physical layer for transfer across the physical links. Link layer may support multiple messages, such as a request, snoop, response, writeback, non-coherent data, etc.

In some implementations, a Link layer can utilize a credit scheme for flow control. Non-credited flows can also be supported. With regard to credited flows, during initialization, a sender is given a set number of credits to send packets or flits to a receiver. Whenever a packet or flit is sent to the receiver, the sender decrements its credit counters by one credit which represents either a packet or a flit, depending on the type of virtual network being used. Whenever a buffer is freed at the receiver, a credit is returned back to the sender for that buffer type. When the sender's credits for a given channel have been exhausted, in one embodiment, it stops sending any flits in that channel. Essentially, credits are returned after the receiver has consumed the information and freed the appropriate buffers.

In one embodiment, routing layer can provide a flexible and distributed way to route packets from a source to a destination. In some platform types (for example, uniprocessor and dual processor systems), this layer may not be explicit but could be part of the Link layer; in such a case, this layer is optional. It relies on the virtual network and message class abstraction provided by the Link Layer as part of the function to determine how to route the packets. The routing function, in one implementation, is defined through implementation specific routing tables. Such a definition allows a variety of usage models.

In one embodiment, protocol layer can implement the communication protocols, ordering rule, and coherency maintenance, I/O, interrupts, and other higher-level communication. Note that protocol layer, in one implementation, can provide messages to negotiate power states for components and the system. As a potential addition, physical layer may also independently or in conjunction set power states of the individual links.

Multiple agents may be connected to an interconnect architecture, such as a home agent (orders requests to memory), caching (issues requests to coherent memory and responds to snoops), configuration (deals with configuration transactions), interrupt (processes interrupts), legacy (deals with legacy transactions), non-coherent (deals with non-coherent transactions), and others.

In some implementations, clock gating functionality can be provided in connection with other functionality present on a system to assist in managing power consumption of the system. Clock gating/ungating (sometimes referred to collectively herein as "gating") can allow clocks of particular components, units, sub-components, and sub-units, etc. in the system to be selectively activated, or enabled, and disabled such that the clocks are enabled when there is work to be performed by the component driven by the clock and disabled when there is no work. Clock power, in some systems, can consume a substantial portion of the total chip power and as clock speeds increase, the share of power potentially utilized by system clocks can be expected to rise. Indeed, in some cases, clock power can consume a majority or more of the total chip power. Substantial power saving opportunities can be realized through effective power management of system clocking.

System clocks, in some cases, can be distributed clocks comprising a tree, spine, or mesh network with one or more root clock signals being distributed to one or more levels, or hierarchies, of more local clock sinks, "regions", or other sub-networks. Gating can theoretically be performed at anyone of the levels of a distribute clock network of the system. For instance, in some implementations, a higher-level clock spine can "feed" more local, or lower-level, clock regions. The clock regions can serve as the parent signals for even lower-level local clocks, among other implementations. By gating a higher level, or parent clock signal, lower-level children clock signals can also be gated. For example, gating at the regional clock buffer (RCB) level can cause the same gating to apply to the region's lower-level local clocks, at the local clock buffer (LCB) level, among other examples.

In some implementations, clock gating registers can include logic that accepts enable conditions for use in selectably enabling, or gating, a corresponding clock. In some examples, a message can be sent to clock gating logic to cause a disabled clock to be enabled in anticipation of some work to be performed by system components driven by the gated clock. If the clock is already enabled, the message, or signal, may have no effect. In the event the clock is disabled, if a signal is received in accordance with the enablement conditions of the gating logic, the clock can be gated so as to be enabled and enable functionality of the component(s) consuming the clock signal.

While clock gating has been employed in some modern chips and systems, such solutions have been typically underutilized. Traditional clock gating can introduce additional system latency, risk dropped packets, and other example issues. For instance, power savings realized by clock gating is accomplished by placing clocks in the disabled state. However, if the request or data destined for a component reliant on a gated clock arrives at the destination component prior to the completion of the ungating (enabling) of the clock, the packet may be queued or dropped. Further, some traditional systems may attempt to guarantee ungating of the destination component's clock prior to sending the request to the destination component. However, such an approach can introduced additional latency by effectively queuing the request pending the re-enabling of the destination component's clock, among other issues. While many modern devices include some form of clock gating functionality, in many instances, systems are designed to largely ignore or disable this functionality given the performance penalties and disadvantages of current clock gating solutions.

In some implementations, a clock gating solution can be provided that includes a dedicated channel for sending early wake-warn signals to a destination component for use by clock gating logic at the destination component to wake or ungate the clock of the destination component in connection with a request that is to be sent to the same destination component to ensure that the clock of the destination component (and, by extension, the destination component itself) is enabled by the time the request arrives at the destination component. The request can be sent effectively in parallel with the early wake-warn signal on a separate path to be transmitted to the destination component over an interconnect while the wake-warn signal is sent over the dedicated wires of the wake-warn communication channel (or link) can allow for simplified, low-latency transmissions with little or no look-up or arbitration features enabling the wake-warn signals to arrive at the destination one or more cycles ahead of corresponding requests targeting the destination been sent over an interconnect link including more robust protocols, full message arbitration, path looks ups, and other features and policies. Interconnects can include PCIe-compliant, QPI-compliant, MIPI-compliant, or other interconnect architectures, among other examples. Such solutions can allow for wake-warn signals to be sent in connection with effectively every request transmitted between components in a system permitting fine-tuned and aggressive control of clock gating at each component to realize more robust utilization of clock gating opportunities present on the system. Corresponding power savings can be realized in excess of other traditional solutions, among other example benefits and advantages not explicitly listed.

Systems can be provided, such as those similar to those shown and described in the examples below, that incorporate principles such as those introduced above. Turning, for instance, to the example illustrated in the simplified block diagram of FIG. 2, a system 200 is shown including a plurality of tiles, or units, each tile including one of a plurality of processor cores (e.g., 202, 204, 206, 208, 210, 212, 214, 216, 218, 220) and corresponding cache banks (e.g., of a last level cache (LLC)) (e.g., 222, 224, 226, 228, 230, 232, 234, 236, 238, 240). In some instances, components of system 200 can be implemented in a microserver or other server system. Each tile can further include logic for managing interactions of the cores (e.g., 202, 204, 206, 208, 210, 212, 214, 216, 218, 220) with one or more of the cache banks (e.g., 222, 224, 226, 228, 230, 232, 234, 236, 238, 240). For instance, each tile can include cache box logic, core box logic, or combined core-cache box logic (collectively referred to herein as "Cbo" logic) (e.g., 242, 244, 246, 248, 250, 252, 254, 256, 258, 260) to interface a core with a system cache (e.g., LLC) and provide functionality for use in connection with requests from cores (or other components) involving cache records. Such functionality can include logic for determining a cache bank corresponding to a requested cache record, sending a request to a cache agent (e.g., on a corresponding cache box), determining a path for sending the request, performing cache coherency, among other example functionality. Each tile or unit can further include a respective interconnect interface (e.g., 264, 266) interfacing the unit (and component core, cache bank, etc.) with the interconnect 265. Cbo logic can interface with, or in some cases, incorporate a corresponding interconnect interface (e.g., 264, 266). Additionally, in the particular example of FIG. 2, a dedicated wake-warn link or channel 270 can be provided and each unit can be connected (e.g., through an interface (e.g., 264, 266)) to both the interconnect 265 and the wake-warn channel 270.

Figure 2:
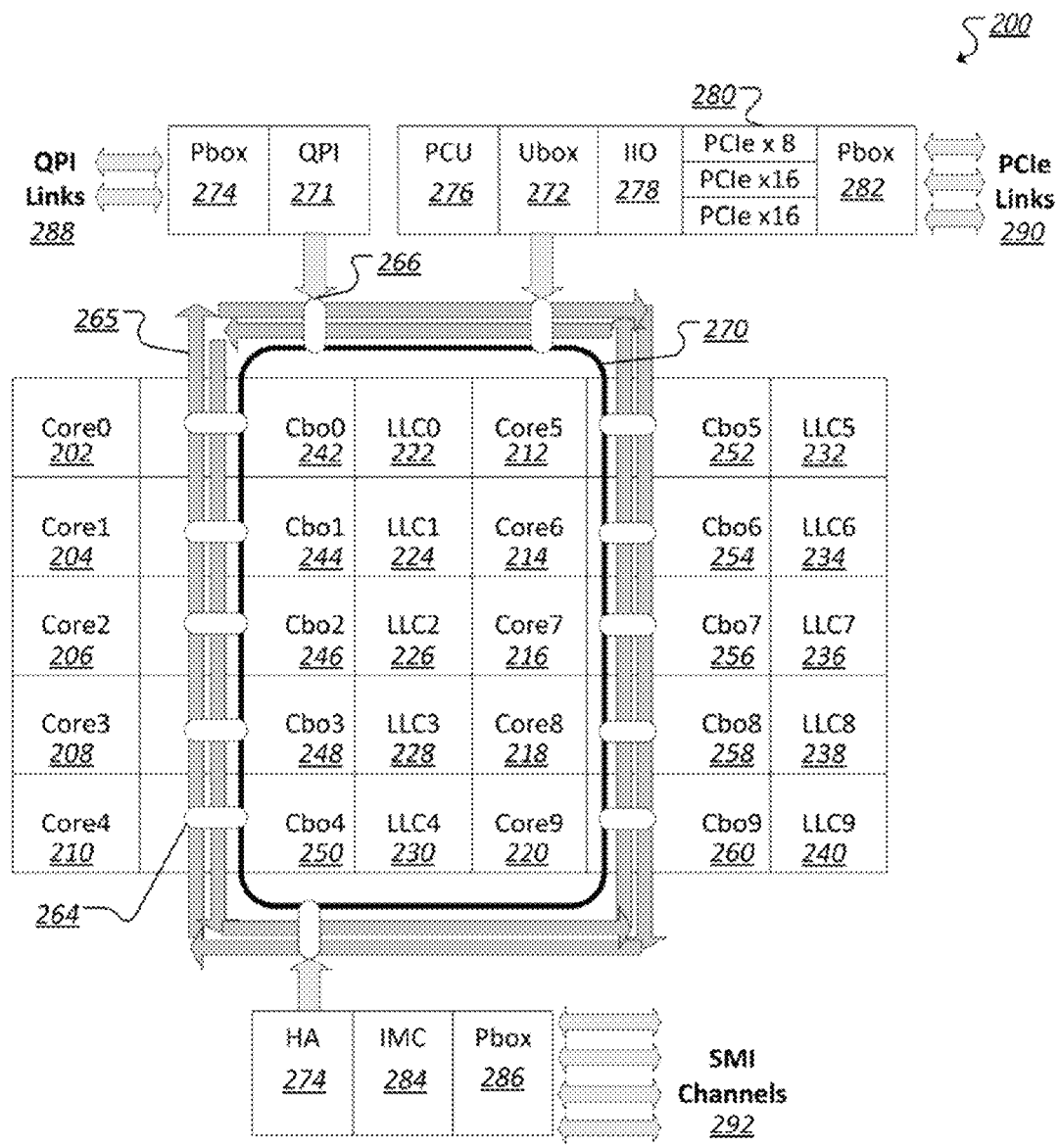
FIG. 2 illustrates a block diagram of a multi-core system including an interconnect and an example wake-warn channel.

In the example of FIG. 2, a ring interconnect 265 is shown and a corresponding wake-warn channel 270 is provided in a ring-style orientation. It should be appreciated that other interconnect architectures can be provided, including mesh, multi-ring, hybrid ring-mesh, and other interconnects. Corresponding wake-warn channels can be provided that mirror the general physical layout or orientation of the interconnect. For instance, ring-style wake warn channels can be provided in connection with ring-style interconnects, mesh-style wake warn channels can be provided in connection with mesh-style interconnect, and so on. In other instances, the wake-warn channel can adopt a design or layout independent of and different from that of the interconnect. The wake-warn channel can be a simplified communication channel and the considerations driving the layout of the interconnect (e.g., 265) may not apply to the wake-warn channel. In some implementations, a layout for the wake-warn channel can be adopted to further enhance the wake-warn channel's ability to transmit wake-warn signals to a destination in fewer cycles than used by the interconnect to transmit a corresponding substantive request or message, among other examples and considerations.

In some implementations, Cbo logic or other logic on a unit (such as logic of a corresponding core and/or interconnect interface) can include logic to generate and send early wake-warn signals on the wake-warn channel 270. A wake-warn signal can target a particular destination unit and can identify the unit and/or a subcomponent of the unit, such as a particular cache bank. In some implementations, a dedicated wake-warn channel can include multiple wires and wake-warn signals can be sent on those wires corresponding to the destination unit. In some examples, a wake-warn signal can target or wake multiple units. Indeed, the design can allow for a grouping of units to be awoken by a wake-warn signal, with only one or a subset of those units receiving the eventual request. In such cases, units not receiving the request can be woken for a short duration (e.g., until a timeout upon failing to detect a corresponding, incoming request) and then gated back to a disabled state, while the unit(s) receiving the request remain in the enabled state, among other examples.

As noted above, in some implementations, a wake-warn signal can be sent on a dedicated wake-warn channel that disposes of some of the logic of interconnect 265 including arbitration, some flow control, and path lookup logic allowing the wake-warn signal to progress to the destination faster than the request with which it is associated. In some cases, a wake-warn signal can be sent in conjunction with the sending of a corresponding request to be handled by the destination unit. Sending of the wake-warn signal can be timed so that it is sent within a time window near the sending of the request. For instance, in some examples, wake-warn signals can be injected onto the wake-warn channel 270 anytime bandwidth is available within the time window and the wake-warn signals can progress in both directions on the wake-warn channel 270. Interface logic (e.g., at an interface (e.g., 264, 266)) can monitor the wake-warn channel 270 to identify wake-warn signals identifying a corresponding component associated with the interface. Protocols and policies of the wake-warn channel 270 can be configured to promote the sending of wake-warn signals such that the wake-warn signals always arrive at a destination component prior to a corresponding request of the destination component sent at the same time as (or substantially concurrently with) the wake-warn signal. This can ensure that clocks gated to a disabled state at the destination component are warned of the incoming request in advance of the arrival of the incoming request so that the clock(s) are gated to an enabled state to allow the destination component to handle the request at potentially the moment the request arrives.

A dedicated wake-warn channel (e.g., 270) can be provided together with an interconnect (e.g., 265) in any one of a potentially limitless variety of system layouts, architectures, or floor plans and can be used to connect potentially any combination of components that can be included, for instance, in a system on chip (SOC). The example of FIG. 2 should be appreciated as but one simplified example of such as a system. Components other than a core-cache tile or similar component can also interface with a wake-warn channel (e.g., 270) and interconnect (e.g., 265) and enjoy the benefits of early wake-warn functionality. Indeed, as shown in the example of FIG. 2, other components (e.g., 271, 272, 274), memory controllers and external interface components such as PCIe, QPI, or other interconnect components can interface with the wake-warn channel (e.g., 270) and interconnect (e.g., 265). Early wake-warn signals can thus be addressed to and consumed by such component allowing for other components and channels (e.g., 274, 276, 278, 280, 282, 284, 286, 288, 290, 292) to also potentially enjoy the power savings and other benefits potentially delivered using early wake-warn functionality.

Figure 3:
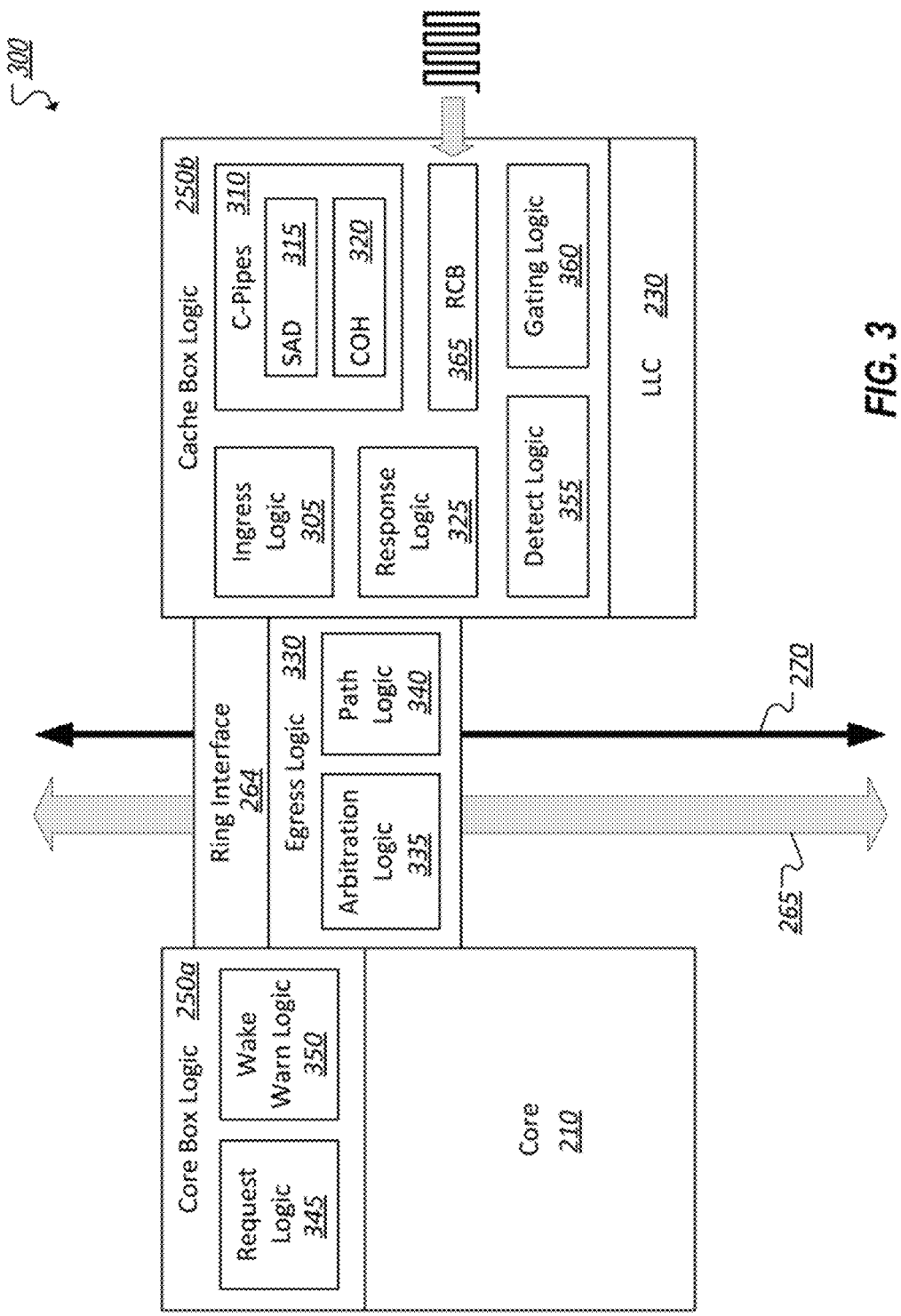
FIG. 3 illustrates a block diagram of system component logic enabling features of early wake-warn functionality.

Turning to the example of FIG. 3, a simplified block diagram 300 is shown illustrated subcomponents of an example system unit, such as a unit including a processor core 210 and LLC bank 230 and supporting logic (e.g., a corresponding core box (e.g., 250a), cache box (250b), etc. (referred to herein, sometimes collectively as "Cbo" (e.g., 250))). In the particular example of FIG. 3, a ring interface 264 is provided capable of interfacing with both an interconnect link 265 and a dedicated wake-warn channel link 270. Cache box logic 250a, in this particular example, can be provided for handling requests involving a particular cache bank 230. Requests can be received directly from core 210, from another core of the system communicating the request over interconnect 265, or another component, including external components seeking a record from the cache. Ingress logic 330 can handle incoming requests for the cache bank 230. C-pipe 310 can include logic for processing the requests. For instance, a system address decoder (SAD) 315 can be provided to determine locations in system memory (e.g., outside of the cache) corresponding to the requested records, for instance, upon determining a cache miss across all cache banks or another determination that the requested record is actually likely in system memory, among other examples. Coherency logic 320 can also be provided to provide cache coherency management involving the cache bank. Response logic 325 can interface with C-pipe logic to generate responses to received requests. Such responses can include data returned from the cache bank 230 (e.g., where the requested record is present on the cache bank), coherency messages, messages indicating a "miss" (i.e., when the requested record is not present on the cache bank), messages pointing to another location in cache or memory where the record might be found, among other examples.

Responses generated by cache box logic 250b can be prepared for sending on the interconnect 265 through the use of egress logic 330. Egress logic 330 can identify a destination of the response and determine (e.g., using path logic 340) a path 340 on the interconnect to send the response. A look-up table or other data and logic can be used by path logic 340 to determine a path that is most appropriate for the response. Egress logic 330 can further include arbitration logic 335 for arbitrating the sending of data on the interconnect 265. Messages to be sent by the cache box logic or core box logic can be queued in some instance, for example, when there is other higher-priority traffic on or about to be injected onto the interconnect 265. Arbitration logic 335 can arbitrate injection of messages competing for interconnect bandwidth including multiple competing messages (e.g., requests and responses) to be sent using egress logic 330. Egress logic 330 can be used by both core box logic 250a and cache box logic 250b to send data onto the interconnect 265. In some implementations, a single shared egress logic module (e.g., 330) can be provided for use by both core box logic 250a and cache box logic 250b, while in other examples dedicated egress logic can be provided for each of core box logic 250a and cache box logic 250b, among other examples.

Core box logic 250a can include logic for processing requests sent from a core (e.g., 210) for memory, cache, or other system resources. Request generation logic 345 can be provided for the generation of requests. The request generation logic 345 can identify an address of a destination component to which the request is to be sent. Egress logic 330 can utilize the address information to identify a best path on the interconnect 265 for sending the requests. In one example, core box logic 250a can further include logic 350 for generating a wake-warn signal associated with a request generated using request logic 345. Wake-warn logic 350 can generate a wake-warn signal that is guaranteed to reach the destination prior to a corresponding request. In some implementations, wake-warn signals can be selectively generated by wake-warn logic 350. For instance, for request targeting local cache banks (e.g., 230), no wake-warn signal may be needed. In other examples, some components may specify that early wake-warn is not supported or disabled and wake-warn logic 350 can forego generating wake-warn signals in connection with the requested destined for such components, among other examples. Interconnect interface 264 can be used to connect the core 210 to the dedicated wake-warn channel and send generated wake-warn signals on the dedicated wake-warn channel to the destination of the wake-warn signals.

The unit illustrated in the example of FIG. 3 can receive wake-warn signals from other components over wake-warn channel 270 in connection with requests of the unit (e.g., cache bank 230). Wake-warn signal detection logic (e.g., 355) can be provided to identify a wake-warn signal on wake-warn channel 270 that is intended for a component, such as a Cbo, cache agent, core, etc., corresponding to the detection logic. Upon detecting a wake-warn signal for a component, or even an individual sub-component or local clock buffer (LCB) of the component, the detect logic 355 can identify the wake-warn event to gating logic 360 configured to gate one or more clock signals (and buffers) of the component. For example, one or more regional clock buffers (RCBs) or another portion of a clock network associated with the component or sub-component can be gated and thereby enabled in connection with the receipt of a wake-warn signal. If the clock is gated to be disabled (e.g., in a power-saving mode), the receipt of a wake-warn signal can cause the clock to be gated and enabled in advance of the receipt of a corresponding request intended for the component. If the clock is already enabled the receipt of a wake-warn signal can be ignored in some instances. In other implementations, detect logic 355 can further utilize a wake-warn signal in connection with gating a clock from an enabled state to a disabled state. For instance, detect logic 355 can further include functionality for detecting inactivity of components or sub-components being driven by particular portions of a clock network to trigger gating of these clocks to a disabled state. In one example, a timer can be applied to gate a clock to a disabled state. Receipt of a wake-warn signal directed to the clock (or associated component) can cause the timer to re-set, in some implementations. The frequency and history of wake-warn signals can be otherwise utilized in timing and determining the gating of clocks from an enabled state to a disabled state to optimize power savings efforts associated with the gating. For instance, a counter can be implemented in connection with detect logic 355 to count and trigger detection of an inactive state based on detected idle or empty states involving the component or sub-component.

In some implementations, less granular clock gating can be implemented by causing wake-warn signals to target a particular component, such as a particular Cbo (and associated core (e.g., 210) and cache bank (e.g., 230)). Such wake-warn signals can be processed to uniformly gate a plurality of clock signals applicable to component (such as at the level of one or more RCBs (e.g., 365) of the component). This can simplify execution of the wake-warn signaling while realizing coarse, yet efficient, gating (e.g., at the Cbo-level). Other implementations can support wake-warn signals that identify and specifically target more local clocks for gating at a more granular level, among other examples It should be appreciated that the examples of FIG. 3 are provided for illustrative purposes only and do not limit the variety of implementations of logic capable of performing early wake-warn signaling and detection, together with corresponding clock gating. For instance, detect logic 355, gating logic 360, and wake-warn logic 350 can be provided in connection with either or both core box logic 250a and cache box logic 250b, or can be alternatively provided in connection with other modules, including, for instance, interface logic, combined core-cache Cbo logic, or other examples. Indeed, detect logic 355, gating logic 360, and wake-warn logic 350 can be provided in connection with other components, including components other than core or cache of a system, such as memory controllers, hub controllers, or other example components.

Figure 4:
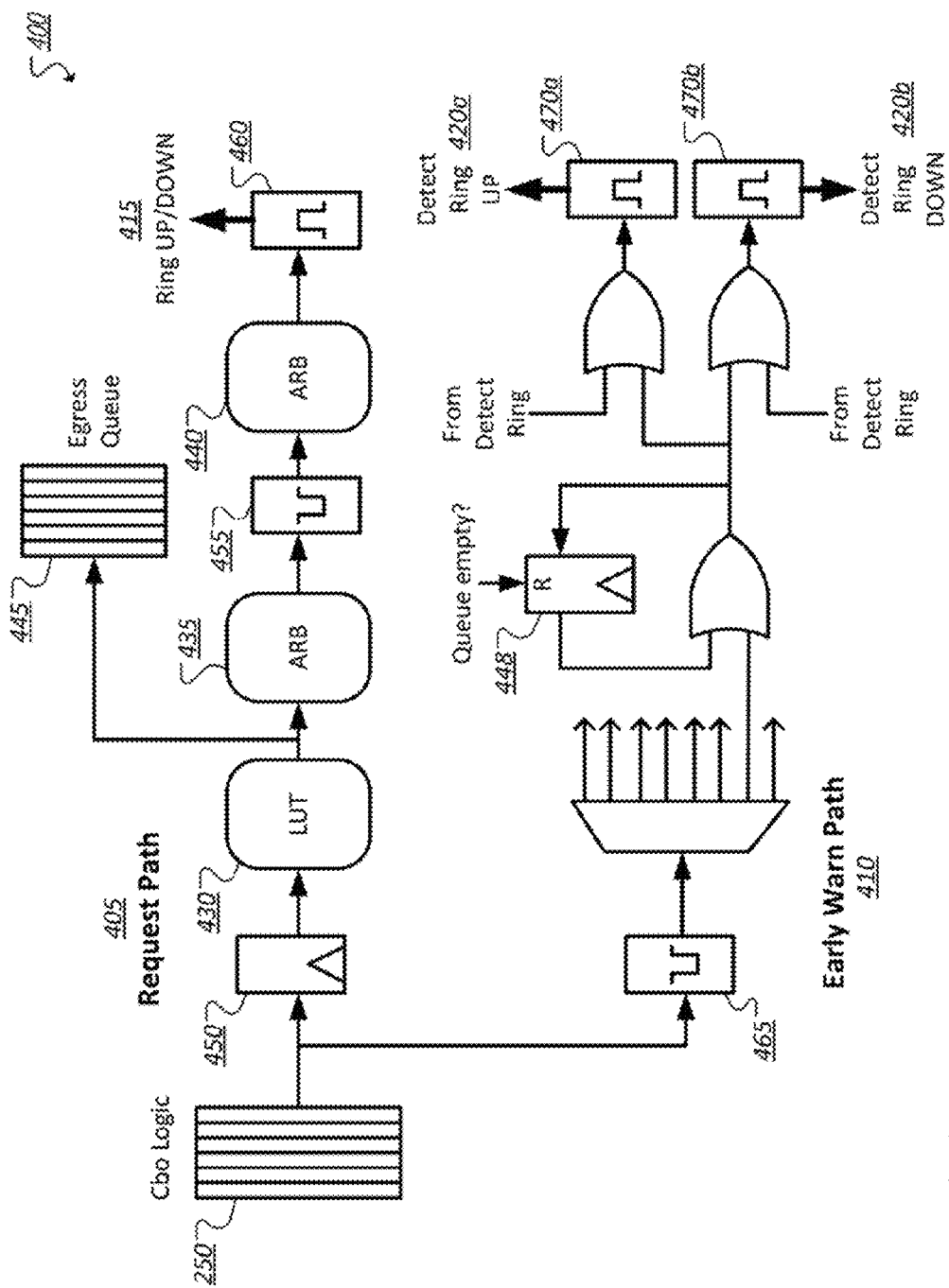
FIG. 4 illustrates a block diagram of a request path and an early warn path in connection with at least some implementations.

Turning to FIG. 4, a simplified block diagram 400 is shown illustrating example message paths 405, 410 supported by Cbo logic 425 of a component capable of providing early wake-warn functionality for sending requests on an interconnect (e.g., at 415) and sending separate wake-warn signals on a distinct wake-warn channel (e.g., at 420a, 420b). In the particular example of FIG. 4, a request path 405 can be provided, with requests generated by Cbo logic 425 to be forwarded to look-up table (LUT) logic 430 and then arbitration logic 435, 440 in connection with protocols provided for sending the requests on the interconnect (e.g., at 415).

The more-intensive processing of requests intended for the interconnect can result in latency in excess of that resulting from the sending of wake-warn signals (along path 410) to a wake-warn channel (e.g., at 420a, 420b). For instance, in this particular example, a full cycle 450 can be utilized to provide the request from I/O logic 425 to LUT logic 430 and a first block of arbitration logic 435. An additional half cycle of latency 455 can be realized from first arbitration logic block 435 to second arbitration logic block 440, and an additional half cycle 460 can be used to inject 415 the request appropriately onto the interconnect in accordance with a path determined for the request on the interconnect.

In contrast, in the example of FIG. 4, an early warn path 410 can be provided that foregoes analogous LUT 430 or arbitration logic 435, 440 allowing for wake-warn signals to be generated, injected onto a wake-warn channel, and arrive at a destination in fewer cycles than utilized in sending a request (over path 405) to the same destination using the interconnect. For instance, in this simplified example, two full cycles are utilized to get a request on the ring over path 405, while a single cycle (comprising half cycle 465 and half cycle 470a, 470b) utilized to inject a corresponding wake-warn signal onto the wake-warn channel. Transmission of the wake-warn signal can be at least as fast as transmission of the request on the interconnect to the same destination. Indeed, in this example, even if a wake-warn signal corresponding to a particular request were generated a half cycle behind the generation of the request, the wake-warn signal, in this example, could still be injected onto its channel prior to the injection of the request onto the interconnect, allowing the wake-warn signal to arrive at the destination prior to request and cause any desired gating of clocks at the destination in anticipation of the incoming request. In some implementations, a wake-warn signal can be generated and being proceeding along path 410 concurrently with the generation and progression of the corresponding request along path 405. Indeed, early wake-warn functionality can be provided that adds no additional latency to the request path 405 than would be observed in the absence of a corresponding early wake-warn signal and path 410. Accordingly, request latency need not be compromised through the provision of early wake-warn functionality.

In connection with timing the sending of wake-warn signals with the normal progression of a corresponding request, additional logic can be provided, in some implementations, to buffer wake-warn signals to account for corresponding buffering of the related request in request path 405. Given interconnect policies utilizing arbitration and other flow controls, in some instances, requests may be queued (e.g., 445) pending the availability of the interconnect or path determined for the request. A queuing control 448 can be provided on the early warn path 410 that monitors the queue status 445 of the request path to determine whether wake-warn signals should also be queued. In some implementations, given the simplicity of the wake-warn channel, it can be important to ensure that wake-warn signals are not sent too much earlier than their corresponding requests. In some implementations, component receiving a wake-warn signal can map the wake-warn signal to the corresponding incoming request on the assumption that the incoming request will arrive within a particular window following the wake-warn signal, among other examples. In one example, a wake-warn signal can be allowed to ungate a clock of the receiving unit for a period corresponding to the period in which the corresponding request might by buffered at the receiving unit, thereby holding the effects of the wake-warn signal for a period corresponding to an expected period in which the corresponding request will be processed, among other examples. Accordingly, wake-warn signals, in some instances, can be additionally buffered (e.g., at 448) to delay sending of the wake-warn signals in accordance with delays imposed on the request by arbitration or other logic on request path 405, among other examples.

Further, as shown in the particular example of FIG. 4, while requests may be sent according to particular defined paths on an interconnect (e.g., in an upward or downward direction of a ring interconnect), wake-warn signals may not be so constrained and can be effectively broadcast in multiple directions as provided by the design of the wake-warn channel such that every other component connected to the wake-warn channel sees the wake-warn signal. While other, more controlled protocols can be applied to an implementation of a wake-warn signal, in the particular example of FIG. 4, the wake-warn channel is oriented (like the interconnect) in a ring-style interconnect. Further, rather than sending the wake-warn signal in a particular direction on the (bi-directional) wake-warn channel (e.g., according to a shortest or fastest path), the wake-warn signal can be sent concurrently 420a, 420b in both directions on the wake-warn ring, to assist in further simplifying and reducing latency associated with the sending of the wake-warn signal relative to the latency for sending 415 a corresponding request on the ring interconnect (e.g., using PCIe, QPI, or other interconnect architecture policies and protocols), among other examples.

Figure 5A:
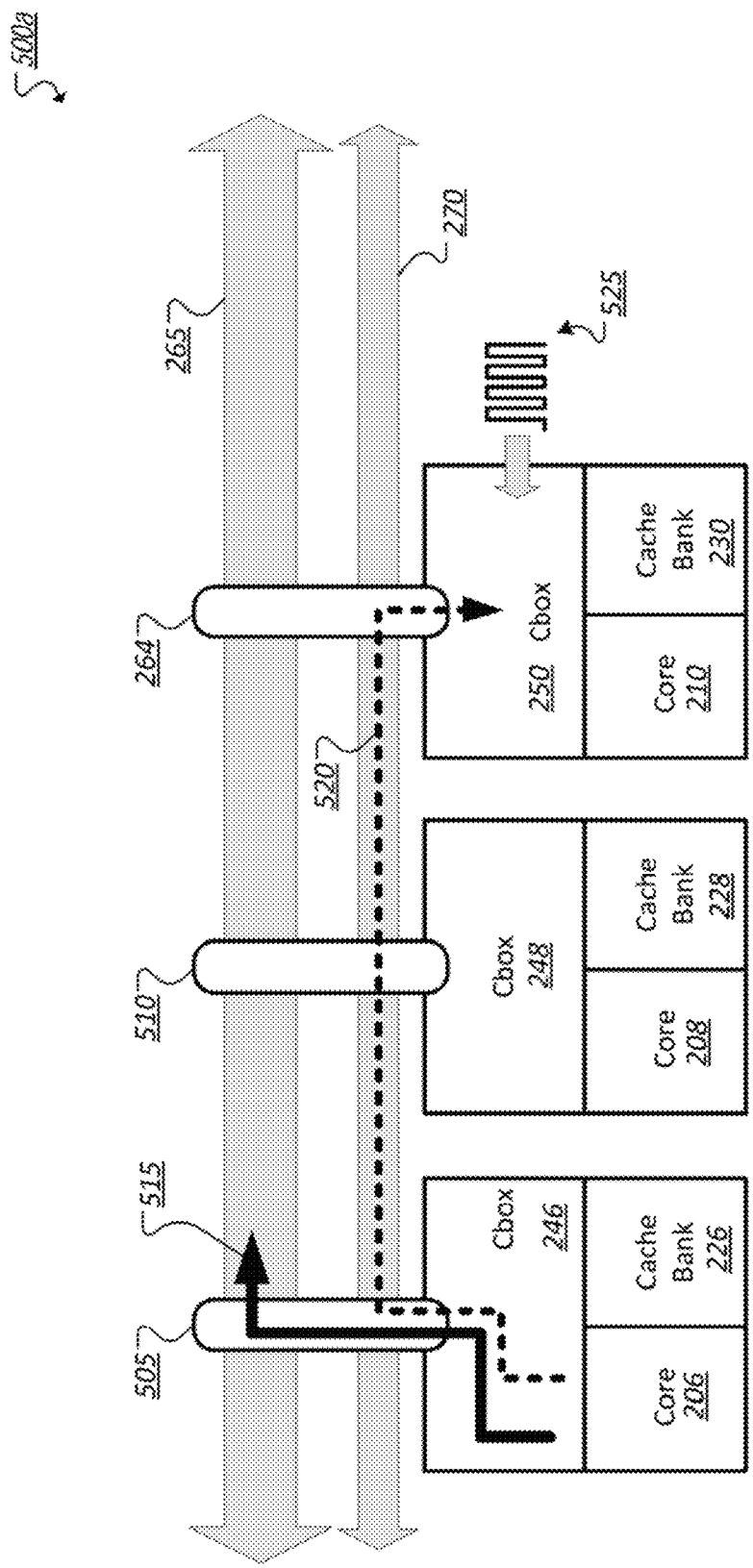
FIGS. 5A-5C illustrate example flows involving wake-warn signals to gate/ungate clocks of system components in advance of a request of the system component.
Figure 5B:
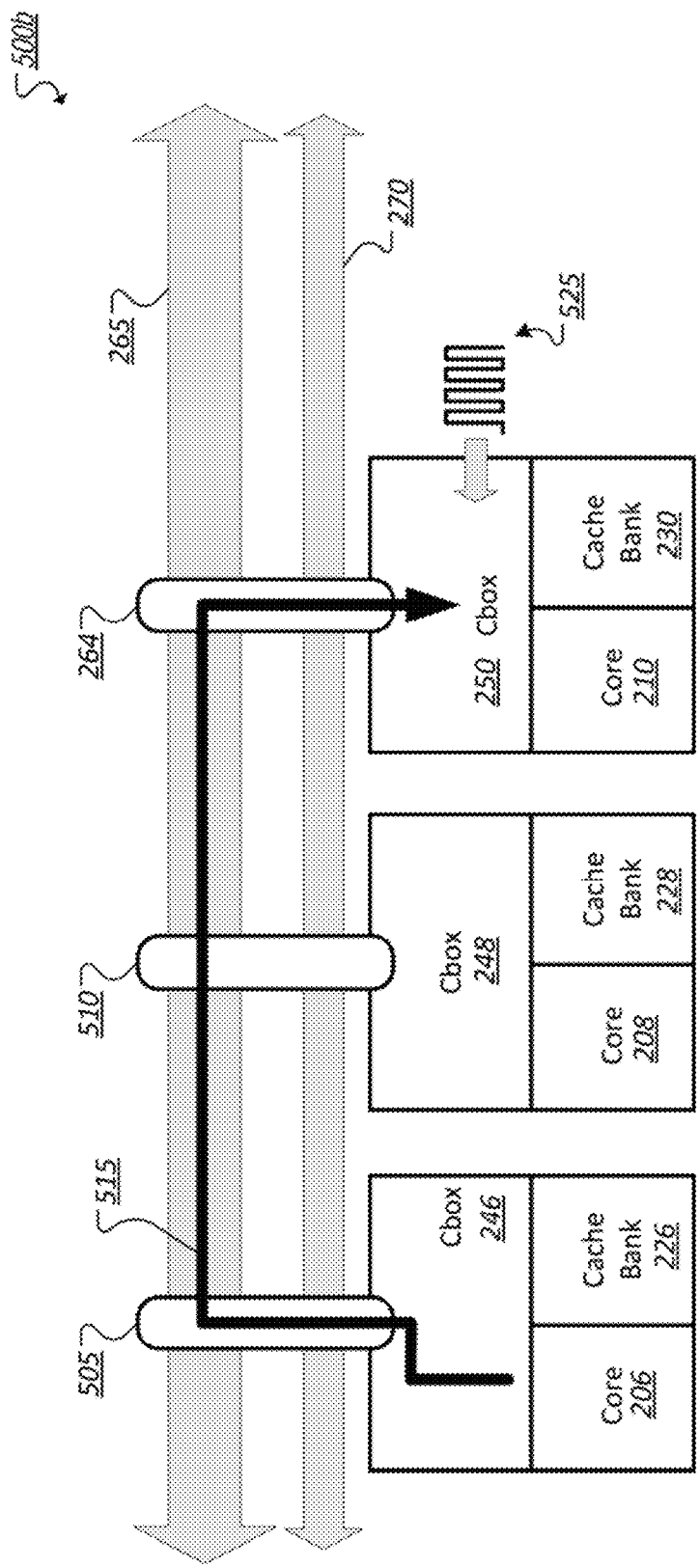
Figure 5C:
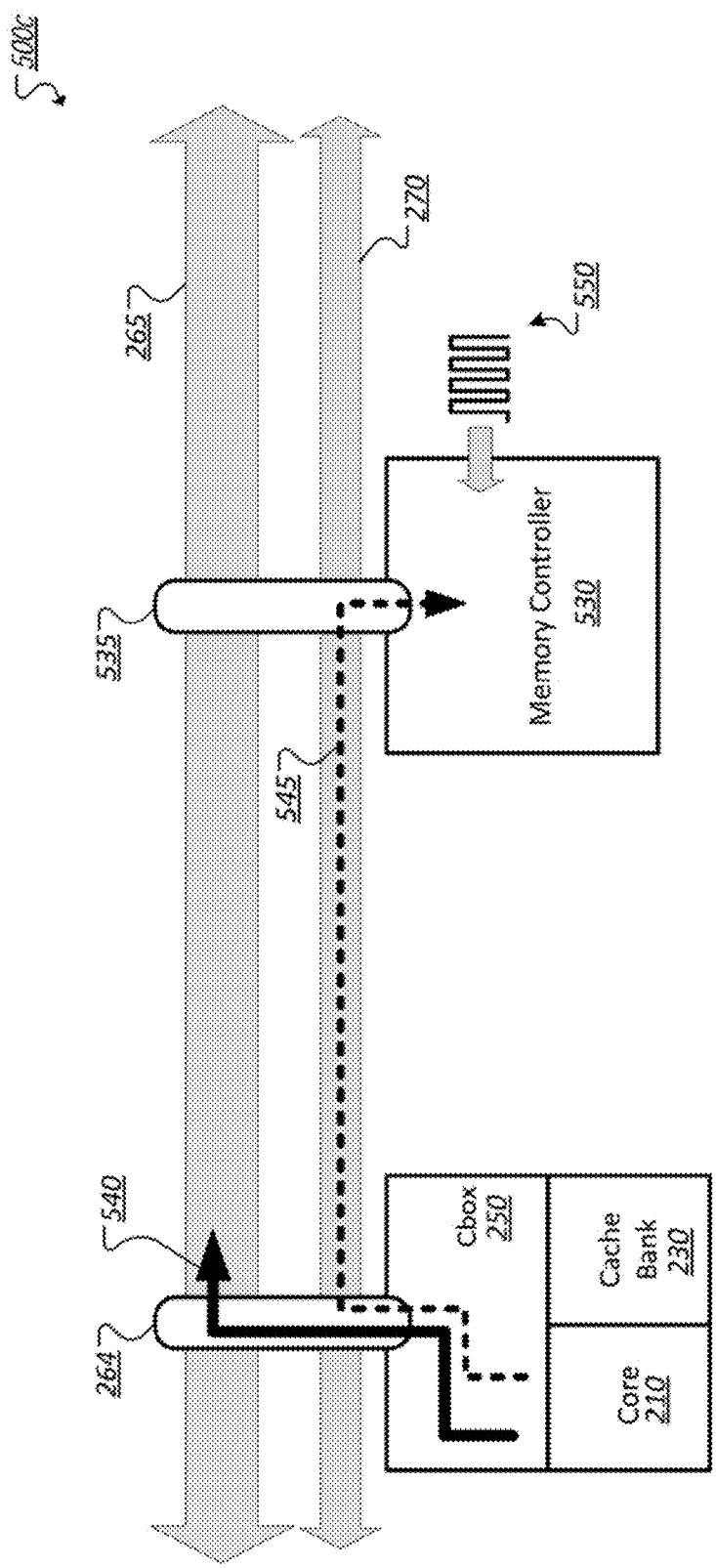

The simplified block diagrams 500a-c of FIGS. 5A-5C illustrate certain examples of requests and wake-warn signals sent from one component to another in a system utilizing principles such as those described elsewhere herein. In the example of FIG. 5A, a core 206 generate a request for a cache record the core 206 determines is located on cache bank 230. The request 515 is generated together with a wake-warn signal 520 and sent on interconnect 265 using I/O logic, for instance, at Cbox 246, interconnect interface 505, or another module. The wake-warn is likewise sent but on wake-warn channel 270. As represented in FIG. 5A, the wake-warn channel can enable wake-warn signals to be injected and sent to a destination (e.g., Cbox 250) in fewer cycles than it takes to inject and send request 515 on interconnect 270. This allows wake-warn signals to be consistently and reliably sent that will preempt the arrival of corresponding requests all while preserving the minimum latency that might be used to send the request 515. In other words, no latency is to be added to a request path to postpone arrival or processing of a request (e.g., 515) to allow for warning and gating the destination (e.g., 250) of the request.

As shown in the example of FIG. 5A, a wake-warn signal 520 can be sent to target a particular one of a plurality of Cbo's (e.g., 246, 248, 250) or other component controlling a unit of the system. The wake-warn signal 520 can be identified by interface 264 (or Cbo logic 250) to determine that the wake-warn signal is intended for the Cbo 250 (and, by extension, core 210 and cache bank 230). Further, in this example, prior to the arrival of the wake-warn signal 520 the clock signal of Cbo 250 is gated to disable the clock. In response to receiving the wake-warn signal 520 gating logic of the Cbo 250 can enable the clock 525 and thereby prepare the Cbox 250 for the arrival of the corresponding request 515. Indeed, turning to the example of FIG. 5B, with the wake-warn signal 520 detected and processed and clock 525 enabled, the Cbox 250 can be awoken and prepared for the arrival of request 515 at a time after the arrival of the wake-warn signal 520 (at FIG. 5A). For instance, the request 515 may arrive one or more cycles after the arrival of wake-warn signal 520.

Continuing with the previous example and turning to the simplified block diagram 500c of FIG. 5C, the Cbox 250 can process the request 515 and determine, for instance, a cache miss and further determine that the records corresponding to the request 515 are instead located in system memory. Cbox 250 can include logic for identifying a memory controller 530 managing the system memory where the records are understood to be stored and generate an additional request 540 on behalf of the original requester (e.g., core 206) to forward the request for the records to memory controller 530. Further, Cbox 250 can likewise include or have access to logic that allows a corresponding wake-warn signal 545 to warn the memory controller 530 of the incoming request 540. Accordingly, the wake-warn signal 545 can also be injected onto wake-warn channel 270 and arrive at the memory controller 530 prior to the arrival of request 540. If the memory controller 530 supports clock gating and the relevant clock 550 of memory controller 530 is gated to a disabled state, receipt of the wake-warn signal 545 (at interconnect interface 535) can cause gating logic of the memory controller 530 to gate the clock 550 to an enabled state and prepare the memory controller 530 (or particular, relevant sub-components of the memory controller) for the arrival and processing of request 540, among other potential examples and interactions.

Turning now to the simplified flowcharts 600a-b of FIGS. 6A-6B, example techniques are illustrated in connection with the provision of early wake-warn functionality in a system. For instance, in the example of FIG. 6A, a request can be generated 605 that is to be sent over an interconnect to another component in a system, such as to a cache bank on a system-on-chip. Clock gating can be applied at the component. A wake-warn signal can be generated and sent 610 over a dedicated channel distinct from the interconnect to the system component to warn the system component of the incoming request and trigger gating (or, more precisely, ungating) of one or more clocks at the system component to enable the clocks in the event the clocks are disabled (e.g., in connection with power savings gating of the clock). The request can be sent 615 over the interconnect. The wake-warn channel can be configured such that generating and sending the wake-warn signal at or near the same time as the request can still allow, and in some cases guarantee, that the wake-warn signal arrives at the system component before the request (without buffering of the request) allowing ungating to take place in advance of the request's arrival.

In the example of FIG. 6B, a dedicated wake-warn channel can be monitored for applicable wake-warn signals on the channel. A wake-warn signal can be received 620 over the wake-warn channel from another system component. A clock, for instance, a local or regional clock buffer, or even the clock spine, can be ungated 625 based on the receipt 620 of the wake-warn signal. For instance, if the clock is disabled when the wake-warn signal is received/detected, the receipt of the wake-warn signal can trigger the ungating of the clock from the disabled state to an enabled state. The receipt 620 of the wake-warn signal and the corresponding clock gating 625 can be completed prior to receiving 630 a request from the other system component over an interconnect, the request corresponding to the previously received wake-warn signal received 620 over the dedicated wake-warn channel. With the clock enabled, the request 635 can be processed. For instance, the request can request a cache record of a cache bank and the request can be processed 635 to determine whether the cache record is present in the cache and, if not, where the requested record is likely located (e.g., another cache bank or memory), among potentially many other forms of requests and transactions between components connected using the interconnect associated the receiving system component can Note that the apparatus', methods', and systems described above may be implemented in any electronic device or system as aforementioned. As specific illustrations, the examples below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 7:
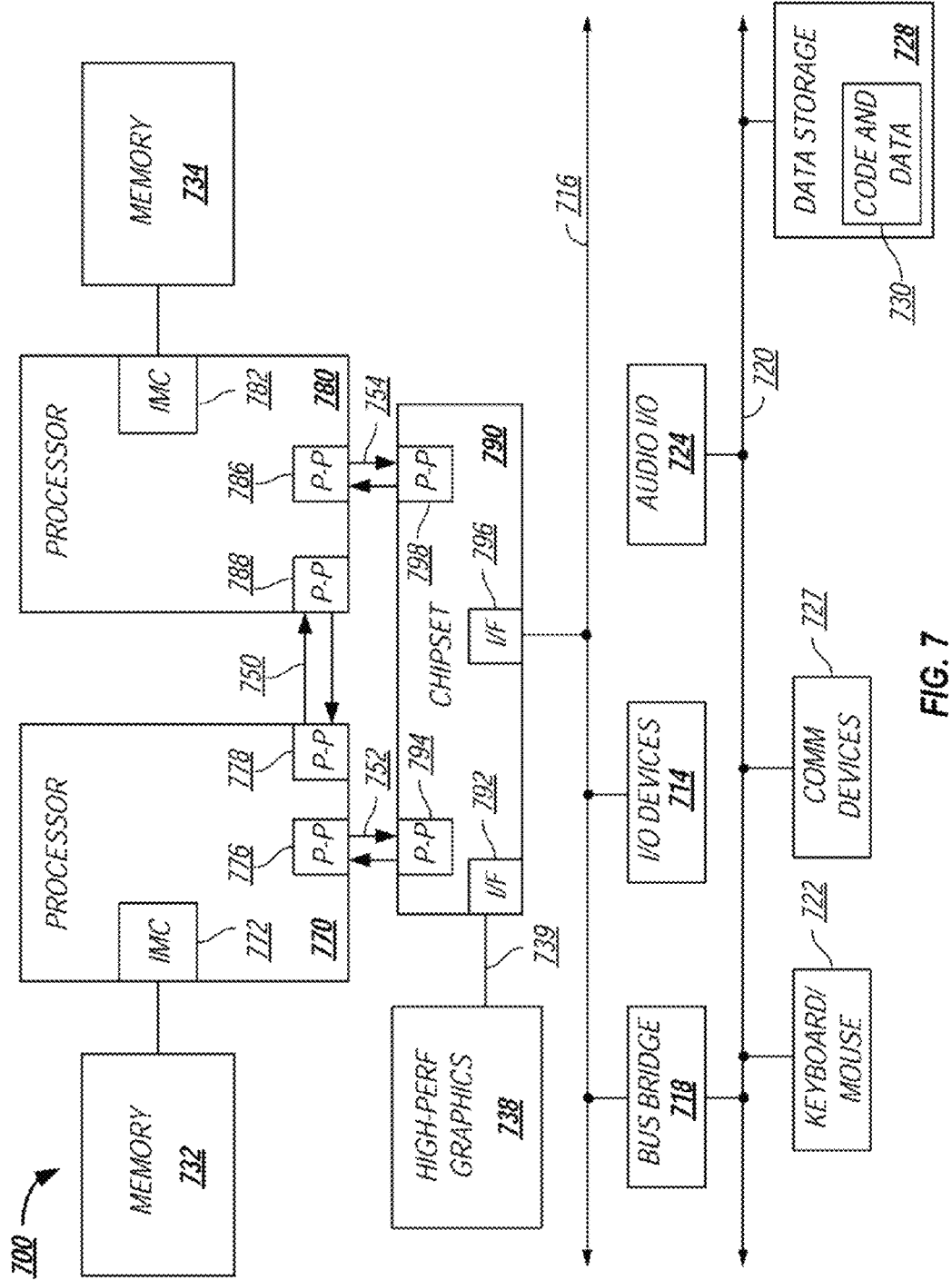
FIG. 7 illustrates another embodiment of a block diagram for a computing system.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of a processor. In one embodiment, 752 and 754 are part of a serial, point-to-point coherent interconnect fabric, such as Intel's Quick Path Interconnect (QPI) architecture. As a result, the invention may be implemented within the QPI architecture.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 each exchange information with a chipset 790 via individual P-P interfaces 752, 754 using point to point interface circuits 776, 794, 786, 798. Chipset 790 also exchanges information with a high-performance graphics circuit 738 via an interface circuit 792 along a high-performance graphics interconnect 739.

A shared cache (not shown) may be included in either processor or outside of both processors; yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 are coupled to first bus 716, along with a bus bridge 718 which couples first bus 716 to a second bus 720. In one embodiment, second bus 720 includes a low pin count (LPC) bus. Various devices are coupled to second bus 720 including, for example, a keyboard and/or mouse 722, communication devices 727 and a storage unit 728 such as a disk drive or other mass storage device which often includes instructions/code and data 730, in one embodiment. Further, an audio I/O 724 is shown coupled to second bus 720. Note that other architectures are possible, where the included components and interconnect architectures vary. For example, instead of the point-to-point architecture of FIG. 7, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1110 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and a method to generate a request associated with a particular cache record, where the request is to be sent to a system component associated with a cache bank over an interconnect. A wake-warn signal can be sent over a dedicated wake-warn channel to indicate to the system component that the request is to arrive. Wake-warn signals can cause a disabled clock to be ungated to an enabled state. The request is then sent to the system component.

In at least one example, the request is to be sent to the system component using an interconnect separate from the dedicated wake-warn channel.

In at least one example, the interconnect includes a ring interconnect.

In at least one example, the wake-warn channel is oriented as a ring connecting the apparatus to at least the system component.

In at least one example, the system component includes cache box logic corresponding to the cache bank, where the clock is to be utilized by the cache box logic.

In at least one example, the logic is further to identify buffering of the request prior to sending of the request and buffer the wake-warn signal prior to sending of the wake-warn signal based on the buffering of the request.

In at least one example, the wake-warn signal is to arrive at the system component prior to arrival of the request at the system component.

In at least one example, the wake-warn signal is to be sent substantially concurrent with the sending of the request.

In at least one example, the wake-warn channel is a bidirectional channel and the wake-warn signal is to be sent in both directions on the wake-warn channel.

In at least one example, the wake-warn signal is to influence gating of a regional clock buffer corresponding to the cache bank.

In at least one example, the wake-warn signal is to cause disabling of enabled clocks to be postponed.

One or more embodiments may provide an apparatus, a system, a machine readable storage, a machine readable medium, and a method to receive a wake-warn signal from another system component sent over a dedicated wake warn channel of the system, where the wake warn signal indicates an incoming request to follow the wake-warn signal. The clock can be ungated, based at least in part on the wake-warn signal, to enable a clock prior to receipt of the incoming request. The incoming request can be received over an interconnect and the incoming request can be caused to be processed.

In at least one example, the clock is disabled when the wake warn signal is received.

In at least one example, the logic is further to detect an inactive condition of a particular system component corresponding to the clock and gate the clock to disable the clock based on the inactive condition.

In at least one example, the inactive condition is based on an inactivity timer.

In at least one example, wake-warn signals received when the clock is enabled are to cause the inactivity timer to restart.

In at least one example, the request is for a cache record and the request is to be processed to determine if the cache record is stored at a particular cache bank corresponding to the clock.

In at least one example, the request includes a first request and the logic is further to generate a second request to be sent to a particular system component based on the processing of the first request and send another wake-warn signal over the dedicated wake-warn channel to indicate to the particular system component that the second request is to arrive. The other wake-warn signal is to cause a disabled clock at the particular system component to be ungated to an enabled state and the logic is further cause the second request to be sent to the particular system component.

In at least one example, the second request is based on a determination of a cache miss from the processing of the first request.

In at least one example, the logic is further to monitor the wake-warn channel for wake warn signals addressing a particular one of a plurality of system components.

In at least one example, the wake warn signal identifies the particular system component.

One or more embodiments may provide a system including a first hardware component and a second hardware component connected to the first hardware component by an interconnect and a wake warn channel, the second hardware component including an interface to the interconnect and a wake warn channel, and logic to receive a wake warn signal from the first hardware component sent over the wake warn channel, where the wake warn signal indicates an incoming request to follow the wake warn signal. The clock associated with the second hardware component can be ungated to enable the clock prior to receipt of the incoming request. The incoming can be received over the interconnect and processed.

In at least one example, the first hardware component includes logic to generate the request associated with a particular cache record, where the request is to be sent to a system component associated with a cache bank over an interconnect. The logic of the first hardware component can further generate the wake-warn signal, send the wake-warn signal over the dedicated wake-warn channel to the second hardware component, and send the request to the second hardware component over the interconnect.

In at least one example, the second hardware component is further to generate a second request to be sent to a particular hardware component, send a second wake-warn signal over the dedicated wake-warn channel to indicate to the particular hardware component that the second request is to arrive, and send the second request to the particular hardware component over the interconnect. The second wake-warn signal is to cause a disabled clock of the particular hardware component to be ungated to an enabled state;

In at least one example, the first hardware component includes a first tile including a first processor core and a first cache bank and the second hardware component includes a second tile including a second processor core and a second cache bank.

In at least one example, the first and second hardware components are components of a microserver.

One or more embodiments may provide an apparatus that includes an integrated circuit including an on-die interconnect to couple a plurality of tiles, each tile including a core and a cache agent. The particular tile can include detection logic to determine to gate a clock for at least a portion of the particular tile based on an inactivity indicator associated with the particular tile, and control logic coupled to the detection logic to gate the clock for at least the portion of the particular tile in response to the detection logic determining to gate the clock and ungate the clock for at least the portion of the particular tile at least in time for arrival of a request based on a received early wake signal.

In at least one example, the portion of the particular tile includes one of local clock buffer, regional clock buffer, and clock spine.

In at least one example, the on-die interconnect is one of a ring, mesh, hybrid ring-mesh interconnect architecture.

In at least one example, the inactivity indicator includes at least one of an idle and empty conditions counter.

In at least one example, the early wake signal is received on a wake signal ring.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   logic, implemented at least in part in hardware, to:
   generate a request associated with a particular cache record, wherein the request is to be sent to a particular system component associated with a cache bank over a physical interconnect coupled to a plurality of system components comprising the particular system component;
   send a wake-warn signal over a dedicated wake-warn channel separate from the physical interconnect to indicate to the particular system component that the request is to arrive, wherein the wake-warn channel comprises a physical channel coupled to the plurality of system components, the wake-warn signal identifies the particular system component, and wake-warn signals are to cause a disabled clock to be ungated to an enabled state; and
   send the request to the particular system component.

2. The apparatus of claim 1, wherein the interconnect comprises a ring interconnect.

3. The apparatus of claim 2, wherein the wake-warn channel is oriented as a ring connecting the apparatus to at least the particular system component.

4. The apparatus of claim 1, wherein the system component comprises cache box logic corresponding to the cache bank, wherein the clock is to be utilized by the cache box logic.

5. The apparatus of claim 1, wherein the logic is further to identify buffering of the request prior to sending of the request and buffer the wake-warn signal prior to sending of the wake-warn signal based on the buffering of the request.

6. The apparatus of claim 1, wherein the wake-warn signal is to arrive at the particular system component prior to arrival of the request at the particular system component.

7. The apparatus of claim 6, wherein the wake-warn signal is to be sent substantially concurrent with the sending of the request.

8. The apparatus of claim 3, wherein the wake-warn channel is a bidirectional channel and the wake-warn signal is to be sent in both directions on the wake-warn channel.

9. The apparatus of claim 1, wherein the wake-warn signal is to influence gating of a regional clock buffer corresponding to the cache bank.

10. The apparatus of claim 1, wherein the wake-warn signal is to cause disabling of enabled clocks to be postponed.

11. An apparatus comprising:
logic, implemented at least in part in hardware, to:
receive a wake-warn signal from a first system component sent over a dedicated wake warn channel of the system, wherein the wake-warn channel is electrically coupled to a plurality of system components, the wake warn signal indicates an incoming request to follow the wake-warn signal, and the wake warn signal identifies a particular one of the plurality of system components;
ungate a clock, based at least in part on the wake-warn signal, to enable a clock prior to receipt of the incoming request;
receive the incoming request over an interconnect, wherein the interconnect is electrically coupled to the plurality of system components and separate from the wake warn channel; and
cause the incoming request to be processed.

12. The apparatus of claim 11, wherein the clock is disabled when the wake warn signal is received.

13. The apparatus of claim 11, wherein the logic is further to detect an inactive condition of the particular system component corresponding to the clock and gate the clock to disable the clock based on the inactive condition.

14. The apparatus of claim 13, wherein the inactive condition is based on an inactivity timer.

15. The apparatus of claim 14, wherein wake warn signals received when the clock is enabled are to cause the inactivity timer to restart.

16. The apparatus of claim 11, wherein the request is for a cache record and the request is to be processed to determine if the cache record is stored at a particular cache bank corresponding to the clock.

17. The apparatus of claim 11, wherein request comprises a first request and the logic is further to:
generate a second request based on the processing of the first request, wherein the second request is to be sent to a second one of the plurality of system components;
send another wake-warn signal over the dedicated wake-warn channel to indicate to the second system component that the second request is to arrive, wherein the other wake-warn signal is to cause a disabled clock at the second system component to be ungated to an enabled state; and
send the second request to the second system component.

18. The apparatus of claim 17, wherein the second request is based on a determination of a cache miss from the processing of the first request.

19. The apparatus of claim 11, wherein the logic is further to monitor the wake-warn channel for wake warn signals addressing the particular system component.

20. A method comprising:
generating a request associated with a particular cache record, wherein the request is to be sent to a particular system component associated with a cache bank over physical interconnect connecting a plurality of system components comprising the particular system component;
sending a wake-warn signal over a dedicated wake-warn channel separate from the physical interconnect to indicate to the particular system component that the request is to arrive, wherein the wake-warn channel physically interconnects the plurality of system components, the wake-warn signal identifies the particular system component, and wake-warn signals are to cause a disabled clock to be ungated to an enabled state; and
sending the request to the particular system component.

21. A method comprising:
receiving a wake-warn signal from a first system component sent over a dedicated wake-warn channel of the system, wherein the wake-warn channel is physically coupled to a plurality of system components, the wake warn signal indicates an incoming request to follow the wake-warn signal, and the wake warn signal identifies a particular one of the plurality of system components;
ungating a clock based on the wake-warn signal to enable a clock prior to receipt of the incoming request;
receiving the incoming request over an interconnect, wherein the interconnect is physically coupled to the plurality of system components and separate from the wake warn channel; and
causing the incoming request to be processed.

22. The method of claim 21, wherein the request comprises a first request and the wake warn signal comprises a first wake-warn signal, the method further comprising:
generating a second request to be sent to a second system component;
sending a second wake-warn signal over the dedicated wake-warn channel to indicate to the second system component that the second request is to arrive, wherein the second wake-warn signal is to cause a disabled clock of the second system component to be ungated to an enabled state; and
sending the second request to the second system component.

23. A system comprising:
a first hardware component; and
a second hardware component electrically coupled to the first hardware component by an interconnect and a wake warn channel, wherein the wake warn channel is separate from the interconnect, the second hardware component includes an interface to the interconnect and the wake warn channel, and the second hardware component comprises logic to:
receive a wake warn signal from the first hardware component sent over the wake warn channel, wherein the wake warn signal indicates an incoming request to follow the wake warn signal and the wake warn signal identifies a particular one of the plurality of system components;

ungate a clock associated with the second hardware component to enable the clock prior to receipt of the incoming request;

receive the incoming request over the interconnect; and process the incoming request, wherein the interconnect further couples the first and second hardware components to a third hardware component and the wake warn channel further couples the first and second hardware components to the third hardware component.

24. The system of claim 23, wherein the first hardware component includes logic to:

generate the request associated with a particular cache record, wherein the request is to be sent to a system component associated with a cache bank over an interconnect;

generate the wake-warn signal;

send the wake-warn signal over the dedicated wake-warn channel to the second hardware component; and send the request to the second hardware component over the interconnect.

25. The system of claim 23, wherein the second hardware component is further to:

generate a second request to be sent to the third hardware component;

send a second wake-warn signal over the dedicated wake-warn channel to indicate to the third hardware component that the second request is to arrive, wherein the second wake-warn signal is to cause a disabled clock of the third hardware component to be ungated to an enabled state; and send the second request to the third hardware component over the interconnect.

26. The system of claim 23, wherein the first hardware component comprises a first tile comprising a first processor core and a first cache bank and the second hardware component comprises a second tile comprising a second processor core and a second cache bank.

* * * * *